Sept. 25, 1962  R. A. FINKLER ET AL  3,056,111
DISPLAY SYSTEM

Filed Sept. 21, 1959  13 Sheets-Sheet 1

INVENTORS.
RONALD A. FINKLER
NORMAN POMERANCE
DAVID A. GOLDMAN
MEYER J. ZOLA
BY
ATTORNEY

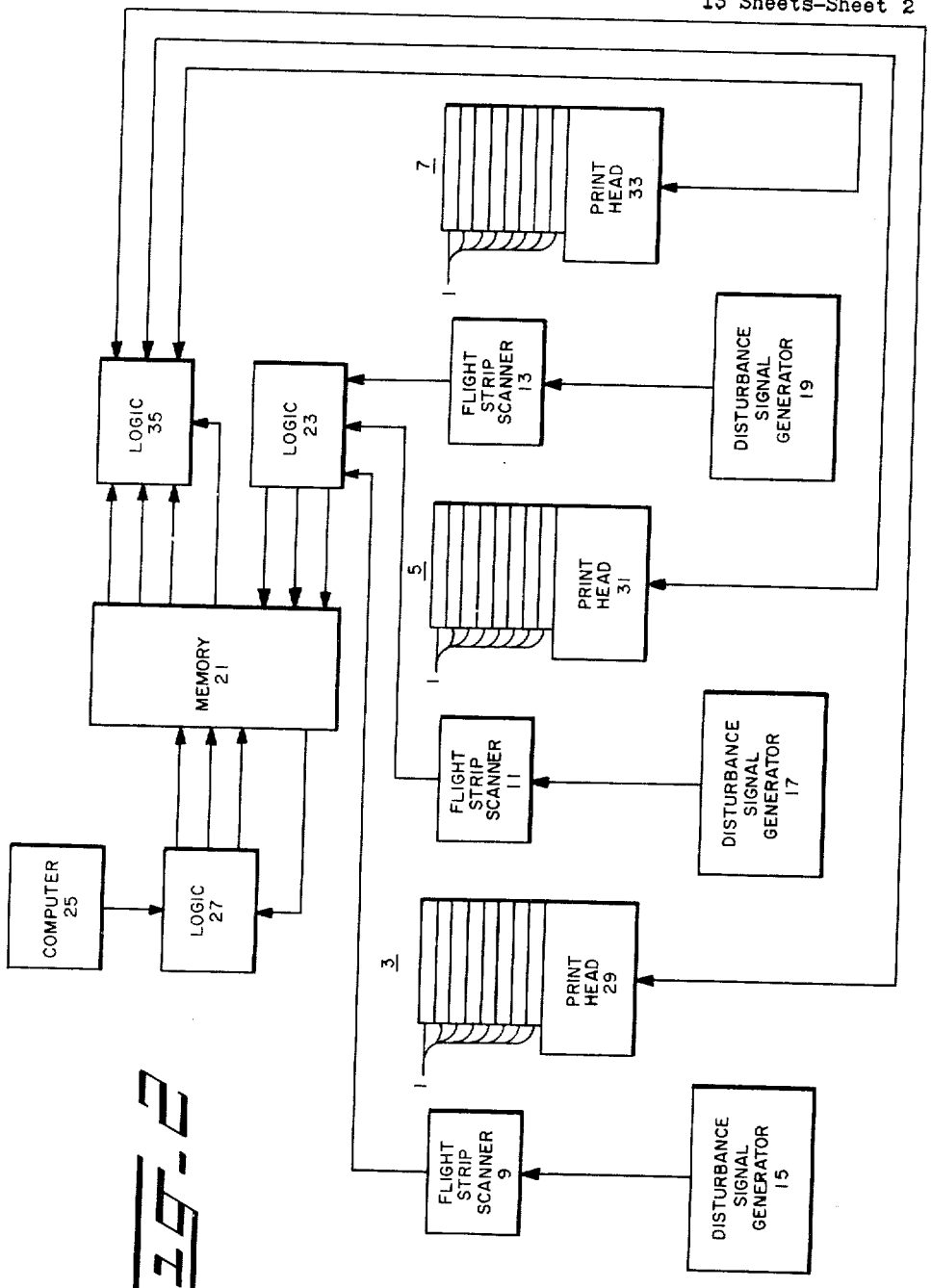

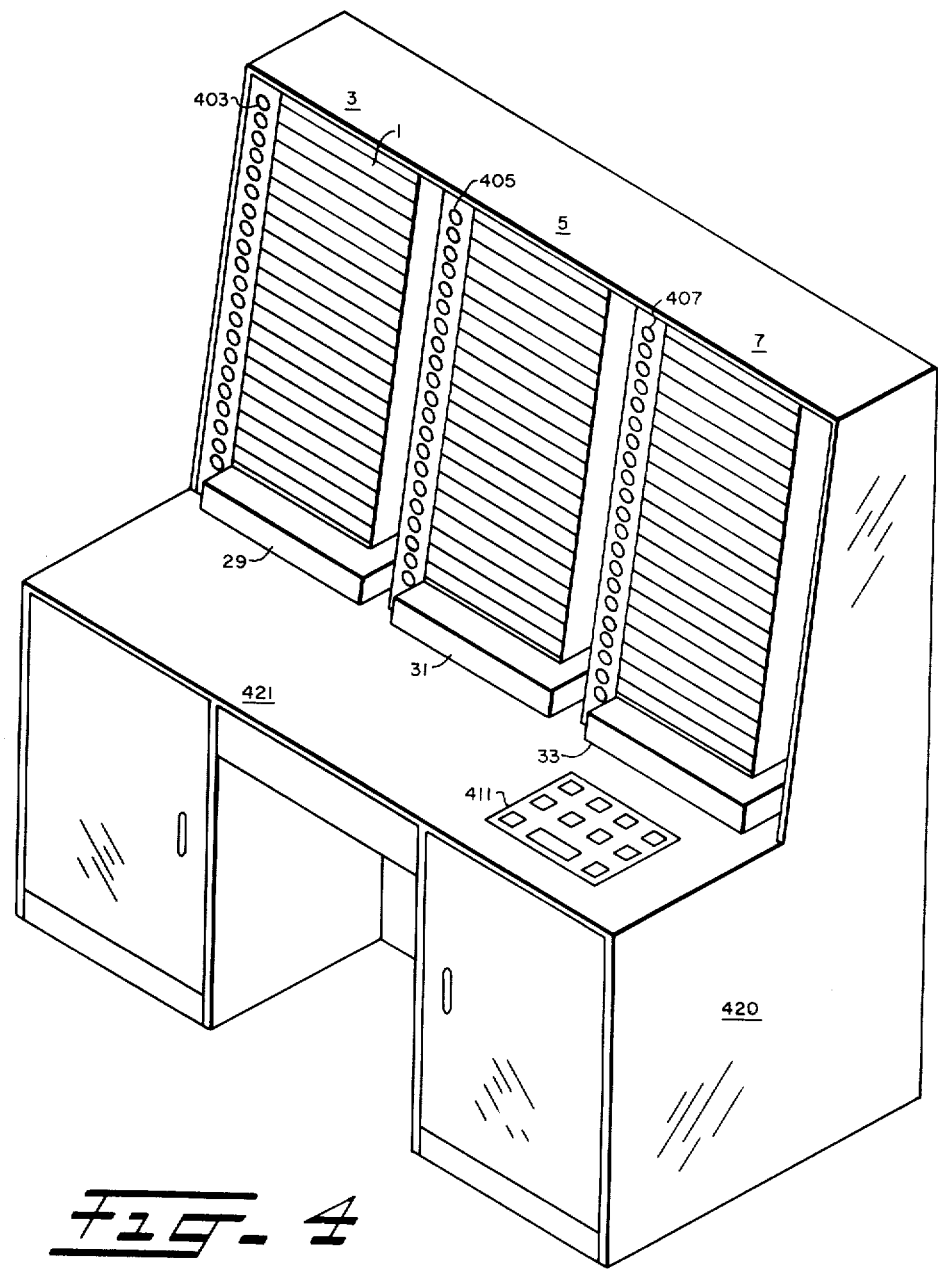

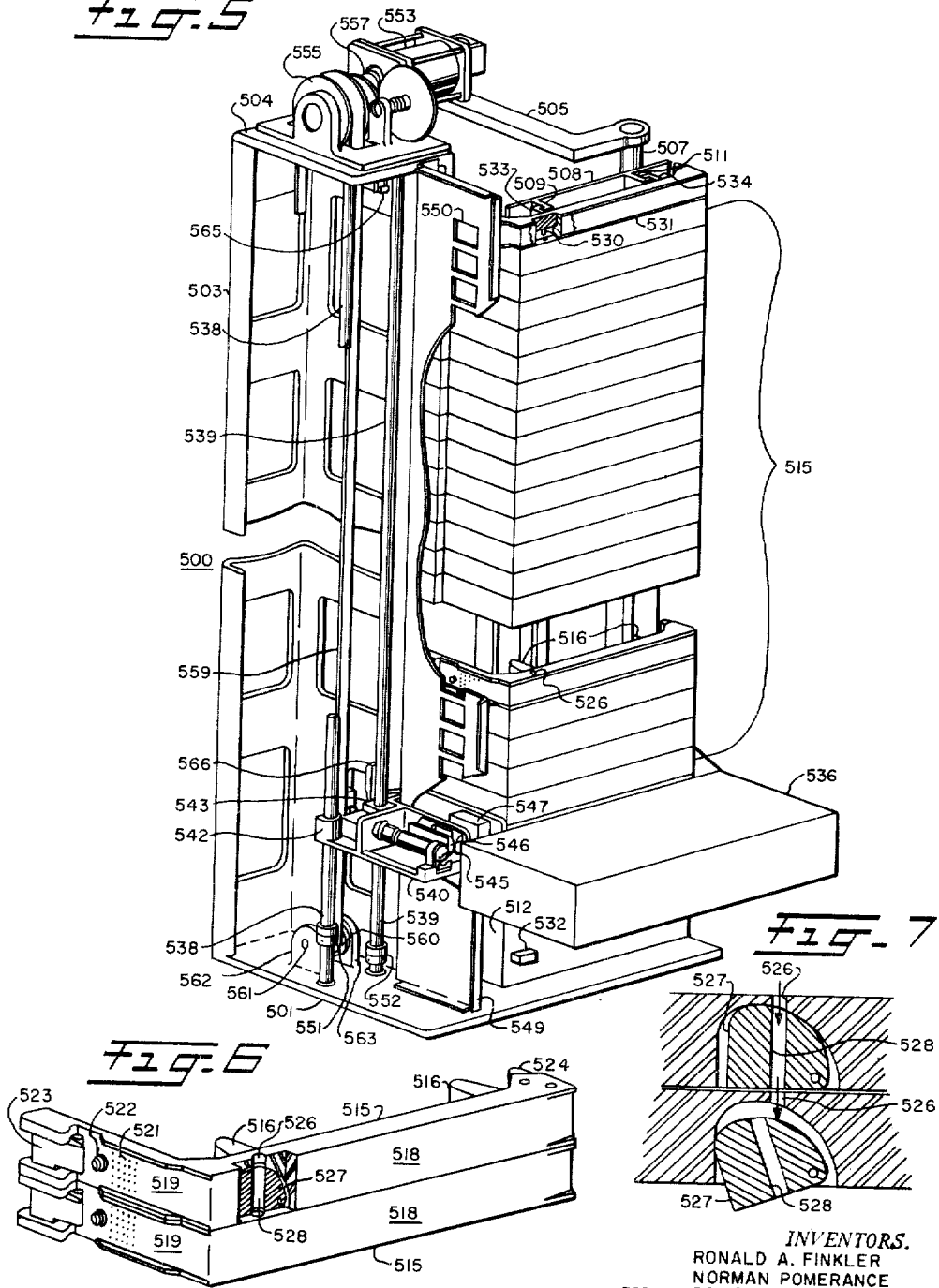

Sept. 25, 1962 R. A. FINKLER ET AL 3,056,111
DISPLAY SYSTEM
Filed Sept. 21, 1959 13 Sheets-Sheet 5

INVENTORS.
RONALD A. FINKLER
NORMAN POMERANCE
DAVID A. GOLDMAN
MEYER J. ZOLA
BY
ATTORNEY.

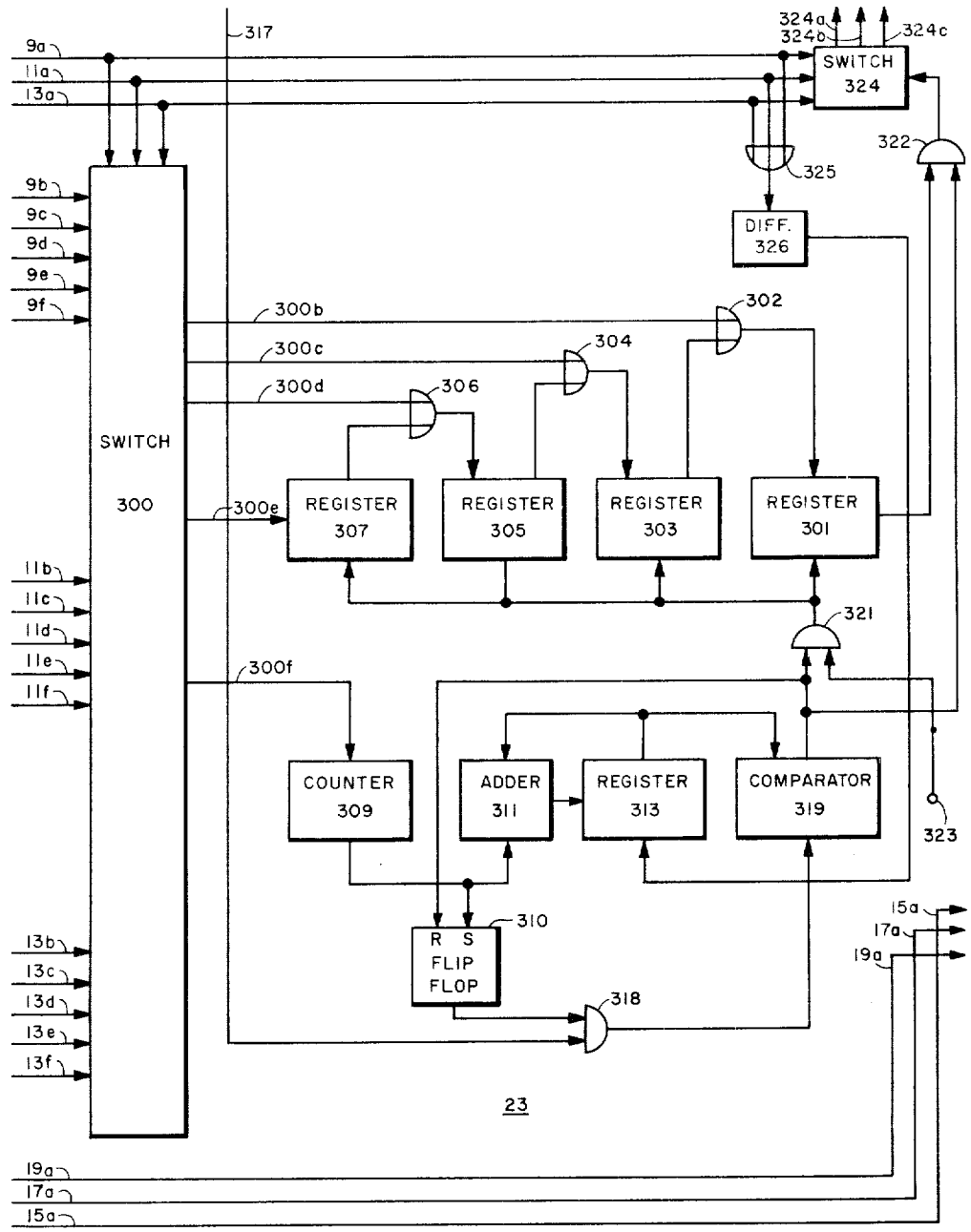
Fig_8b

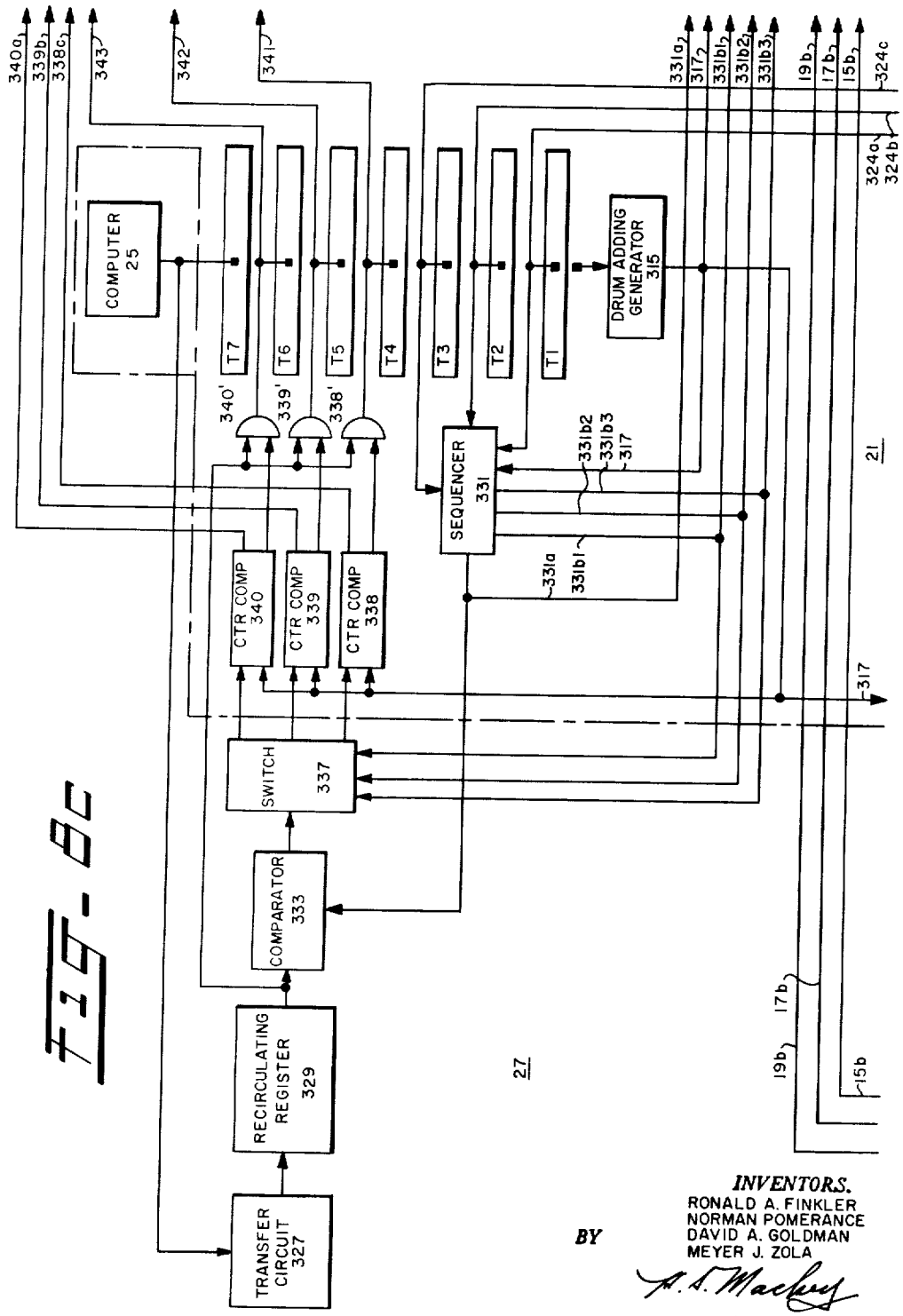

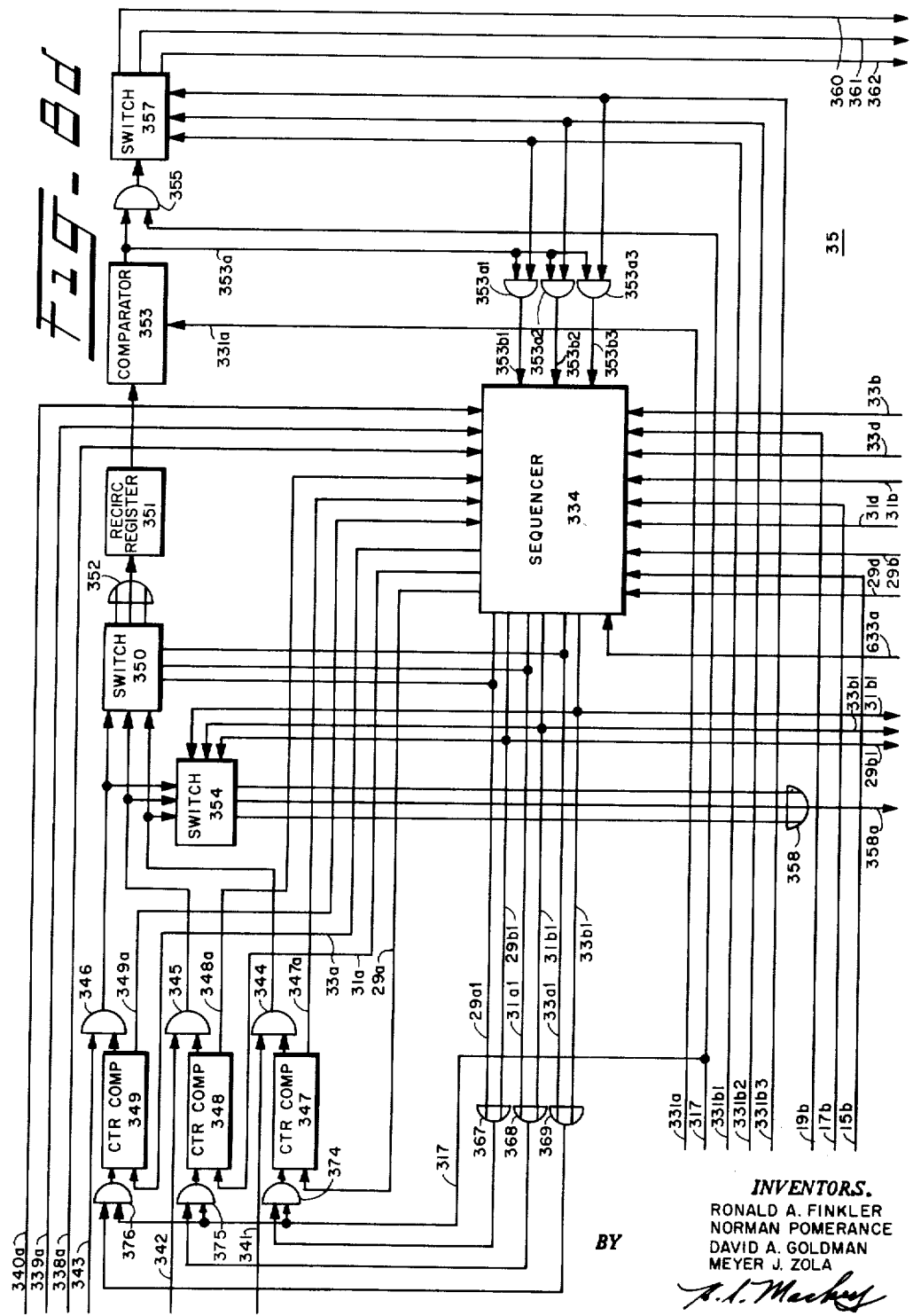

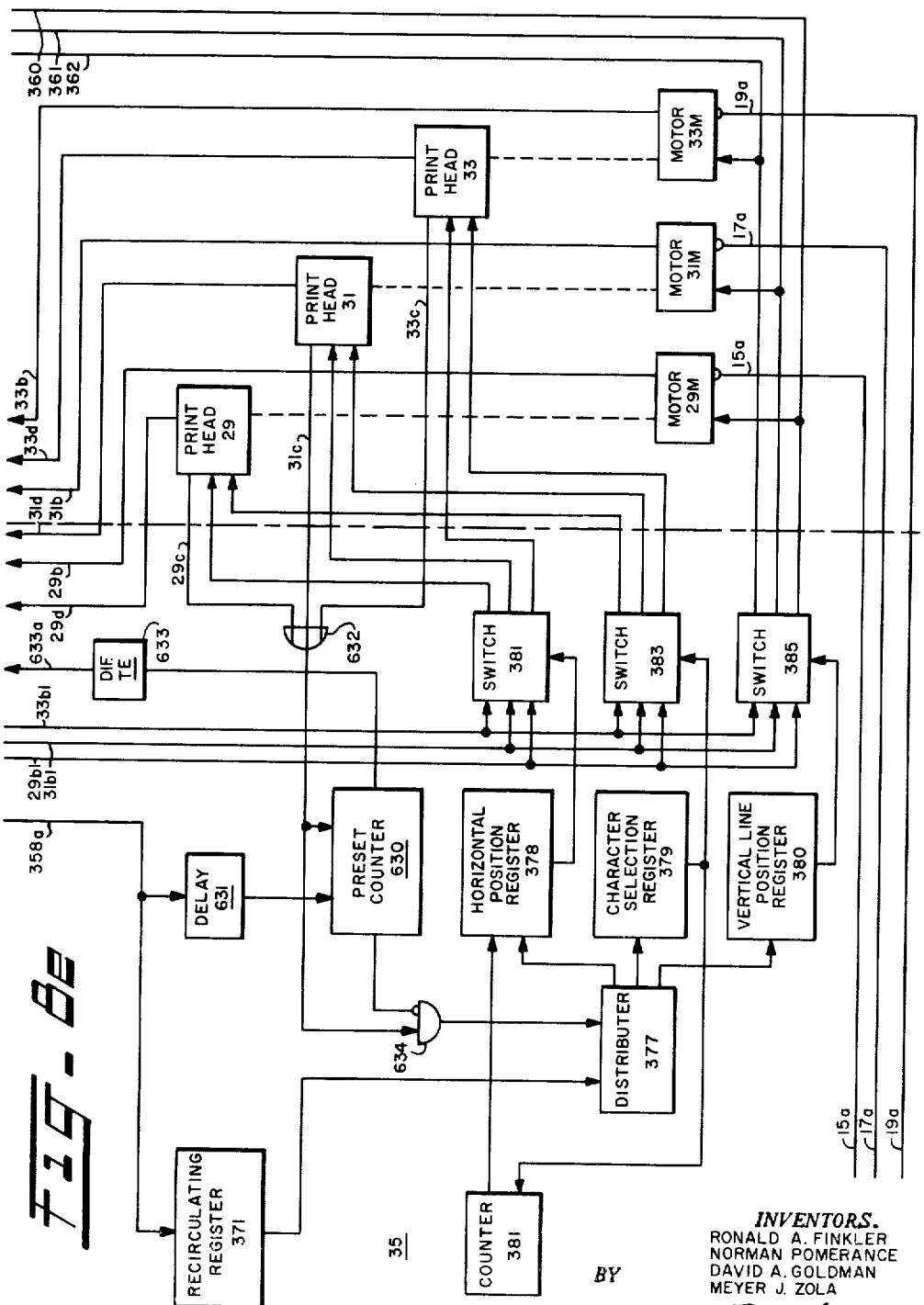

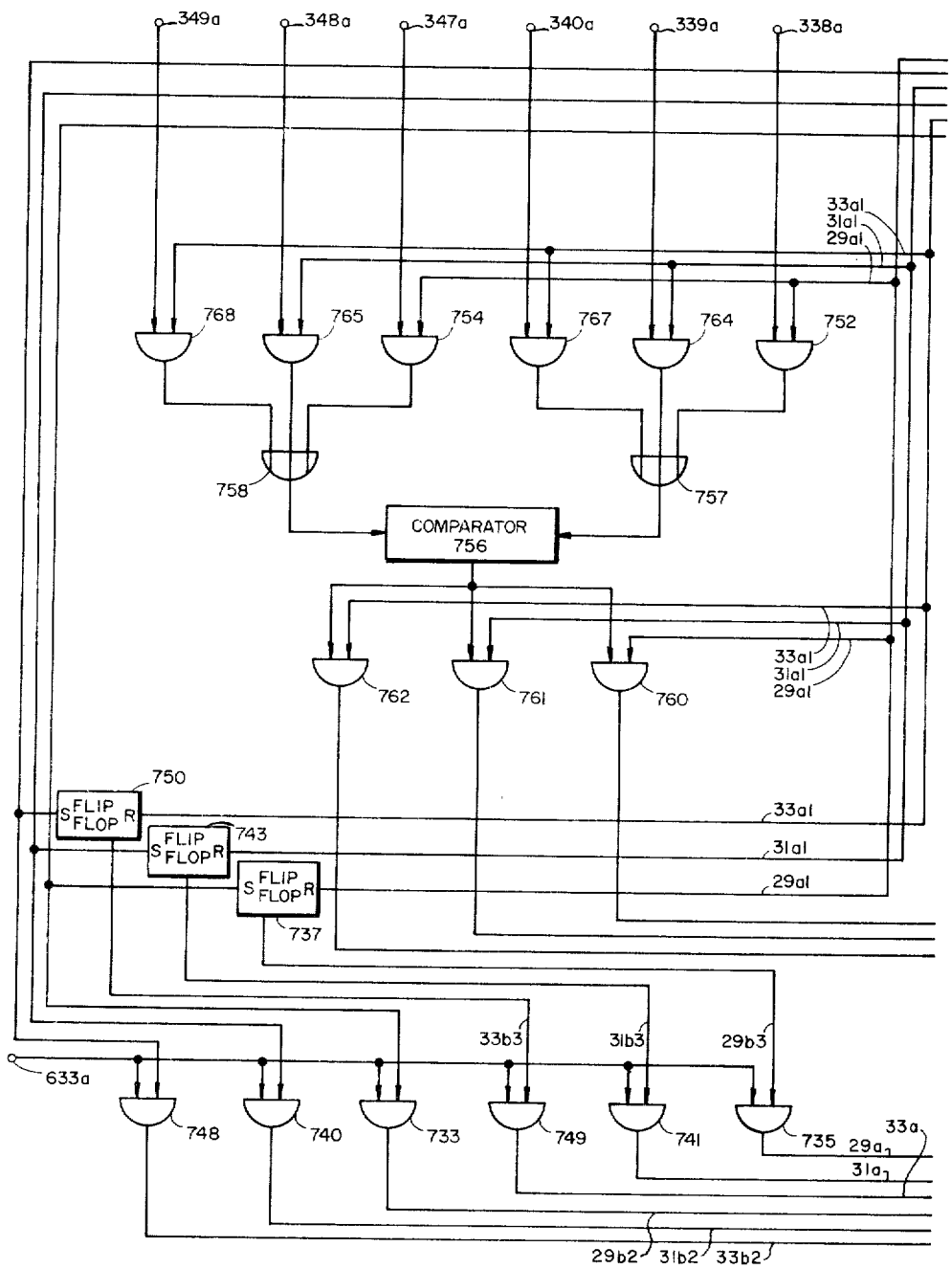

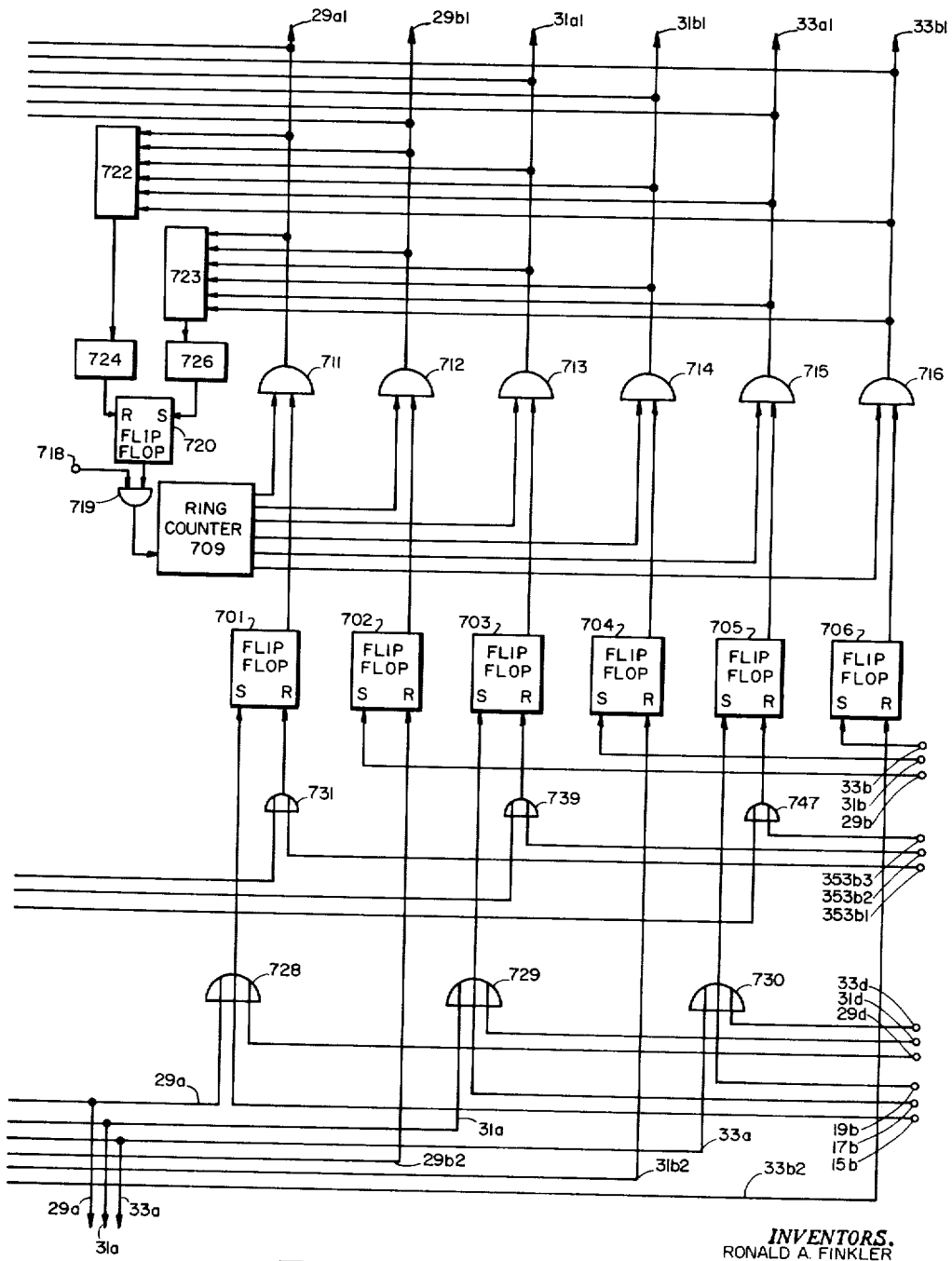

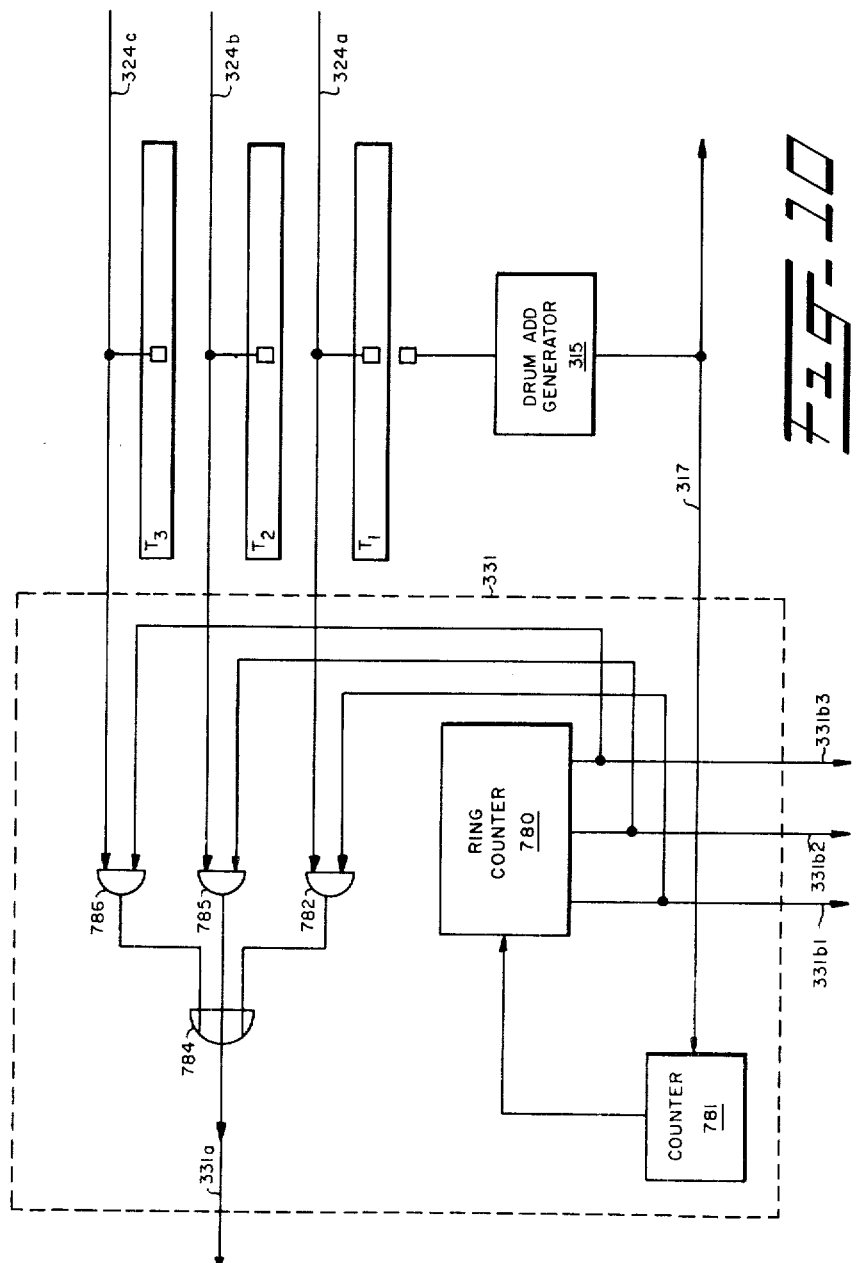

# United States Patent Office 3,056,111
Patented Sept. 25, 1962

3,056,111
DISPLAY SYSTEM
Ronald A. Finkler, Pleasantville, Norman Pomerance, Scarsdale, David A. Goldman, Yorktown Heights, and Meyer J. Zola, Pleasantville, N.Y., assignors to General Precision, Inc., a corporation of Delaware
Filed Sept. 21, 1959, Ser. No. 841,305
13 Claims. (Cl. 340—172.5)

This invention relates to data processing and display systems and more particularly to data processing and display systems which provide a permanent written record for display purposes.

For the purposes of illustration only the invention is described and illustrated as applied to an air traffic control system. It has numerous other applications in the fields of logistics, traffic control and other areas where the display of locations and/or quantities or other information relative to objects or entities is required.

For many years air traffic has presented a severe and pressing problem and with each passing year, due to the increase in air traffic, the problem has become much more acute. Currently the problem is so severe that hundreds of near collisions are reported each day in densely traveled areas. It was therefore necessary to devise a display and data processing system which could keep pace with the constantly and rapidly changing traffic picture presented by today's high performance aircraft and which would at the same time provide a clearly distinguishable picture of air traffic in a given locality at a glance. The system must also provide a permanent written record of aircraft movement and ordered changes in aircraft movement so that the location of all controlled flights is accurately known and potential conflicts may be determined and avoided.

The system selected for accomplishing the above broad objectives divides the airspace into routes and assigns fixed points on these routes at which an aircraft must report. These fixed points are spaced along a route and a strip is prepared for each fix point on a route which sets forth the following information:

(1) Fix point covered
(2) Aircraft identity
(3) Filed air speed and aircraft type
(4) Previous fix point
(5) Previous fix point time of departure if available
(6) Estimated time of arrival over fix point if available
(7) Filed altitude routes and terminals Space is provided on the strip to update the information at any time that conditions change due to either planned or unplanned changes.

A strip similar to that described above is prepared for each and every fix point of each and every controlled flight. The strips are assembled on a console in full view of a sector controller who must resolve conflicts between flights.

One object of the invention is to provide an automatic data processing and display system which is fast, accurate and dependable.

Another object of the invention is to provide a data processing and display system which will accept random information relative to an entity and cause said information to be posted on a preselected medium which is randomly located.

Yet another object of the invention is to provide an automatic data processing and display system which will provide a permanent record of all the data processed.

A further object of the invention is to provide an automatic data processing and display system which may be manually operated in the event of a failure such as a power failure, and which retains all of the information processed up to the time of a failure in an easily recognizable form.

The invention contemplates a data processing and display system comprising media for recording information, memory means having an index portion and an update portion, means for scanning the media and recording portions of the information contained therein in predetermined locations in the index portion of the memory means, a source of information bearing signals, means for scanning the index portion of the memory means and comparing said information bearing signals to the index information and for recording the information bearing signals in the update portion of the memory means in locations which correspond to the index portion of the memory means, and means responsive to the update information for producing changes in the media which corresponds to the information bearing signal.

The foregoing and other objects and advantages of the invention will appear more clearly from a consideration of the specification and drawings wherein one embodiment of the invention is described and shown in detail for illustration purposes only.

In the drawings:

FIGURE 2 is a block diagram of a novel data processing and display system constructed in accordance with the invention;

FIGURE 4 is a projected view of a complete console.

FIGURE 5 is an isometric view of one bay of a data processing and display system constructed in accordance with the invention;

FIGURE 6 is an isometric view of the strip holders;

FIGURE 7 is a cross-sectional view of a disturbance signal generator;

FIGURES 8a, 8b, 8c, 8d and 8e are an expanded block diagram of the novel system shown in FIG. 2;

FIGURES 9a and 9b are a schematic diagram of a sequencing circuit used in FIG. 8; and FIGURE 10 is a schematic diagram of another sequencing circuit used in FIG. 8.

Figure 1:
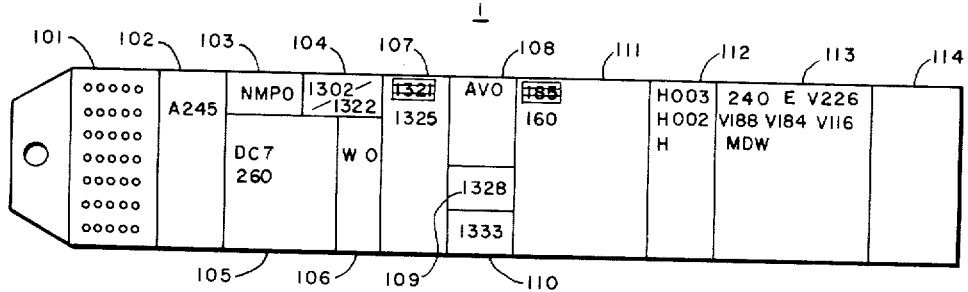
FIGURE 1 is a plan view of a flight strip used for displaying information.

In FIG. 1, reference numeral 1 generally indicates a strip of paper or other material suitable for displaying printed characters and hereinafter referred to as a flight strip. The strip is divided into a plurality of areas identified by reference numerals 101 through 114, inclusive. Each of these areas contains a specific piece of information.

Area 101 is reserved for a 5 x 7 matrix which may be of the punched hole type. One column will always have seven punched holes and is called a clock or sprocket column. This column is used for timing or counting.

The remaining four columns contain coded information which is used to identify the particular aircraft under control and the particular fix point over which that aircraft will pass.

The remaining areas contain printed information which is in full view of the controller when assembled or placed in a bay of a sector console. Area 102 contains the aircraft identification, area 103 the previous fix point in the aircraft's flight plan, area 104 the aircraft's departure time from the previous fix point and the pilot's estimated time of arrival at the fix point covered by the strip, area 105 the aircraft type and the filed air speed of the craft, area 106 an indication of conflicts with other flights at the fix point by the presence of a "W" and an indication of action taken by a controller when he ignores or overrides a conflict by the letter "O," area 107 the estimated time of arrival over the fix point, area 108 the fix point, area 109 the time of arrival over the fix point, area 110 the time of departure from the fix point, area 111 the altitude of the aircraft, area 112 the hold times ordered for delaying purposes, area 113 the filed altitude, routes and terminals of the flight, and area 114 is reserved for the controller's hand written notes.

The information contained in areas 101, 102, 103, 104, 105, 108 and 113 is placed on the strip before it is placed in a bay. This information is not updated by the system and remains unchanged. The information in areas 106, 107, 109, 110, 111 and 112 is supplied by the system and is automatically updated as changes are determined. Three entries are possible in area 106, four in area 107, eight in area 111 and three in area 112. The information in areas 109 and 110 is not entered until the event has occurred and no update provision is made. A consideration of the descriptions of FIGS. 2 and 3 which follow will explain how this information is processed and how the changes are implemented. It should be noted that the format of strip 1 is arbitrary and was selected to suit a particular application. An infinite number of arrangements of information are possible, therefore a typical arrangement was selected for description purposes.

In FIG. 2 a plurality of strips 1, each arranged on an individual holder or platen, not shown, are arranged in three bays 3, 5 and 7. Strips 1 contain printed information suitable for reading and coded information which serves to identify the strips. Three strip scanners 9, 11 and 13 are arranged to scan the strips in bays 3, 5 and 7, respectively. Three disturbance signal generators 15, 17 and 19 are connected to strip scanners 9, 11 and 13, respectively, and institute a scan of the strips contained in a bay which has been disturbed by either the removal of or the addition of a strip or any other movement of the strips which might have resulted in a change in the order of the strips.

The strip scanners are connected to a memory device 21, which may be of the magnetic drum type, through a logic circuit 23. Logic circuit 23 arranges the coded information from each strip in a proper form and arranges the information from each bay on a different track in the memory device. Furthermore, the coded information from each strip is located on the drum in such a way as to correspond to its location in the bay. For example, the information on strip number one in bay 3 would appear in the first position on one track and the information on strip number one in bay 5 would appear in the first position on another track. While the simplest form of one to one correspondence was chosen for illustration purposes, other more complex forms of correspondence might prove more efficient for another application of the invention.

The three tracks of the memory device described above which contain the same coded information contained on the strips in bays 3, 5 and 7, respectively, may be referred to as the index portion of the memory device since, in effect, they duplicate part of the information contained in bays 3, 5 and 7; and this information bears the same positional relationship as does the coded information in bays 3, 5 and 7.

A computer 25 receives information from sources shown in FIG. 3 and described in detail later and supplies information bearing electric signals. These signals contain update information for one or more strips in bays 3, 5 and 7. Each update message also contains the same coded information contained on the strip to which the update information is directed.

The signals from the computer are applied to a logic circuit 27 where the coded information portion of the signal is compared to the coded information in the index portion of the memory device 21. When a successful comparison is made the track in the memory device where the information was stored is noted and utilized to switch the entire update message from computer 25 into a selected update track in the memory device. Update messages will be recorded in one of three update tracks depending entirely on which of the three index tracks the coded information corresponding to its coded information is located.

Three print heads 29, 31 and 33 are located in bays 3, 5 and 7, respectively. Each print head is arranged to traverse the strips in its own bay and is responsive to update messages in one track of the update portion of the memory device 21. A logic circuit 35 connected between the update portion of memory device 21 and the print heads compares the coded portion of the update message with the index portion of the memory device to provide switching to the correct print head and print head positioning information. Once a print head is in its proper position the message is printed and the head returned to its neutral or rest position.

Figure 3:
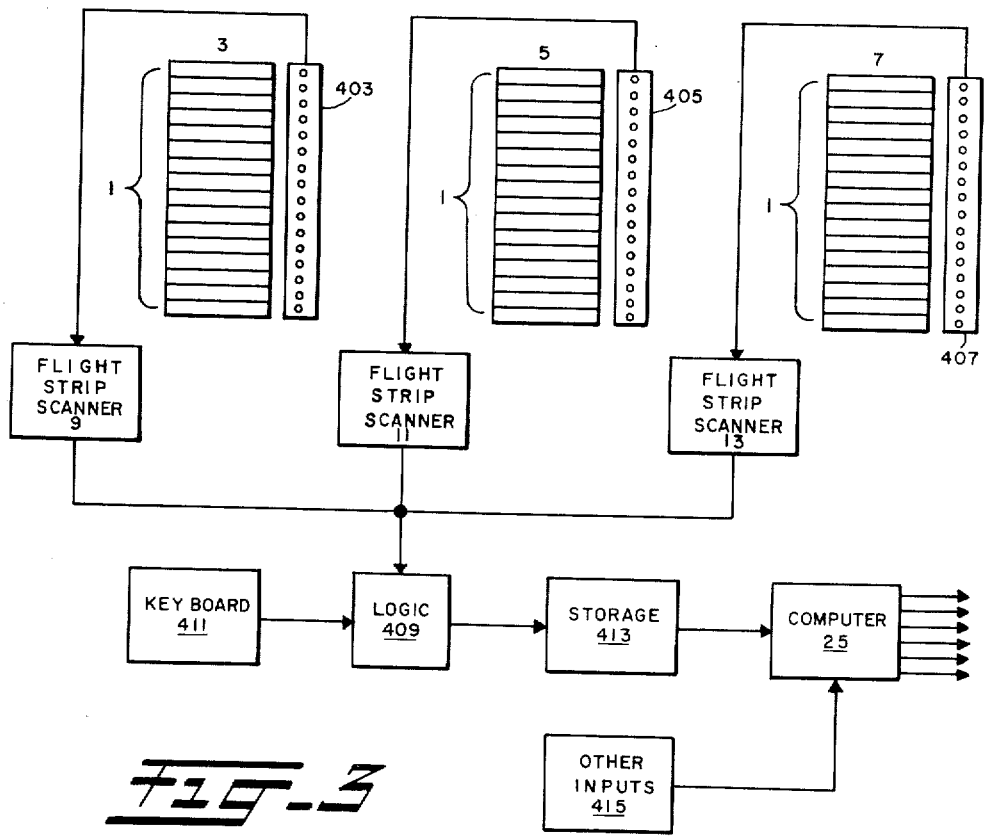
FIGURE 3 is a block diagram showing different computer inputs.

FIG. 3 shows one way of inserting information into the computer 25. The strips 1 are arranged in three bays, 3, 5 and 7, as shown in FIG. 2. Control panels 403, 405 and 407 are arranged in bays 3, 5 and 7, respectively. Each control panel has one button for each strip in the bay. When it is necessary to insert updating information relative to a given aircraft and fix point, the button adjacent that strip is depressed to cause the flight strip scanner to read out the punch coded information on that strip.

The coded information is inserted into a logic circuit 409 along with the updating information which is inserted through a keyboard 411. The signals applied to logic circuit 409 are assembled in a storage circuit 413 and when complete applied to computer 25. Inputs from other sources are shown by block 415. The computer 25 may have a plurality of outputs, one of which will supply bays 3, 5 and 7 as shown in FIG. 2.

FIG. 4 shows the arrangement of the components described in FIGS. 1–3 in a console cabinet 420. The strips 1 are arranged in three bays, 3, 5 and 7. Print heads 29, 31 and 33 are arranged in their respective bays and are free to move up and down as required to print update messages. Control panels 403, 405 and 407 are arranged to the left of the strips in each bay and keyboard 411 is conveniently located on desk-top surface 421 of console 420 near the operator's position.

FIG. 5 shows the construction details of a single bay which has been removed from the console 420 of FIG. 4. A support member 500 has a base 501, a vertical right angle member 503 attached to base 501, and a cap member 504 attached to member 503 at its uppermost end. A bracket 505 is supported at one end by member 503 and has its other end supported by a circular rod 507 which is attached to the base 501 and extends vertically between the base and the bracket. A bed plate 508 is attached to base passage extends from the top to the bottom of a bay and 501 forward of rod 507 and extends vertically upward terminating slightly below the level of bracket 505. A pair of parallel right angle rails 509 and 511 are attached to the front face of bed plate 508 in a back to back relation and extend vertically from the top of the plate to a point short of the bottom, terminating against a stop member 512 which is attached to base 501 and extends along the front face of bed plate 508.

Strip holders 515, shown in detail in FIG. 6, are mounted one on top of another on rails 509 and 511 and are arranged so that they may be easily removed. They are held in place by a pair of lugs 516, made of a magnetic material, which are so spaced as to fit snugly along the outside of rails 509 and 511.

The holders are right angular in shape and have a front platen portion 518 suitable for supporting a strip such as 1 of FIG. 1 on which it is desired to print information, and a rearwardly extending portion 519 which is used for supporting the portion of strip 1 which contains the coded information.

Portion 519 has a 5 x 7 matrix of holes 521 which coincides with area 101 of strip 1 shown in FIG. 1, a locating lug 522 for accurately positioning strip 1, and a clamp 523 at its free end for securing one end of strip 1 to the holder. The other end of strip 1 is secured by a clamp 524 located at the free end of platen portion 518.

Each holder has a light transmitting passage 526 extending from the top of the holder to the bottom and a light obstructing member 527 pivotally mounted therein. Member 527 has a light transmitting passage 528 therethrough so that when the holder is supported by another holder or object light will pass through passages 526 and 528 from the top to the bottom of the holder, and when the holder is not supported the passage of light will be blocked by the opaque portion of member 527. Both conditions are illustrated in FIG. 7. The upper holder is supported, thus providing an unobstructed passage from the top to the bottom of the holder. The lower holder is not supported, therefore, member 527 is urged to an alternate position by the force of gravity and blocks the passage of light through passage 526.

When all of the holders are assembled in a bay one on top of another as illustrated in FIG. 5, a light transmitting passage extends from the top to the bottom of a bay and the light emitted from a source 530 contained within a specially constructed top holder 531 will be detected by a photocell 532 mounted on stop member 512 directly below the passage. Thus when a disturbance of the bay occurs by the removal of or the addition of a holder or any other movement which might have resulted in a change in the order of the holders and their associated strips a signal is generated by the interruption of the light falling on cell 532. Holder 531 is secured to rails 509 and 511 by right angle mounting lugs 533 and 534, respectively. These lugs mesh with the rails and permit vertical movement only.

A print head 536 is supported by circular rod 507 and is free to move vertically up and down the rod when driven by a motor, not shown. The print head traverses the face of the holders and will, when subjected to the proper signals, imprint update messages on one or more strips. The operation of the print head will be described in greater detail in connection with the description of FIG. 8.

A pair of vertical circular rods 538 and 539 are each joined to base plate 501 at their lower ends and to cap member 504 at their upper ends. A U shaped carrier member 540 is slideably mounted on rods 538 and 539 by bearings 542 and 543, respectively, which are attached to the rear of carrier 540.

U shaped member 540 has one leg forward of rearwardly extending portion 519 of holder 515 and its other leg behind portion 519. A light source 545 and lens system 546 are mounted on the front leg and a unit 547 containing five photocells is mounted on the rear leg. Unit 547 is positioned directly behind and in horizontal alignment with the 5 x 7 matrix 521 and will detect the passage of light through area 101 of strip 1 when source 545 is illuminated. A masking plate 549 is inserted between the holder and lens system 546. It is secured to base plate 501 and to cap member 504. A series of openings 550 coinciding with matrix 521 are cut in the masking plate to permit the passage of light from source 545 to the area 101 on the strips 1. A pair of collars 551 and 552 are mounted on rods 538 and 539, respectively, and act as bumpers or stops for U shaped member 540 to restrict its movement in the downward direction.

A motor 553 mounted on cap member 504 turns a drive pulley 555 through a gear train 557. An endless belt passes over drive pulley 555 and an idler pulley 560 mounted on a shaft 561 which is journaled in two upright members 562 and 563 attached to base 501. Carrier 540 is attached to belt 559 and will be raised or lowered when motor 553 is powered.

A microswitch 565 mounted on the underside of cap 504 between rods 538 and 539 reverses the rotation of motor 553 when the carrier 540 makes contact, and another microswitch 566 mounted on vertical member 503 toward the bottom thereof stops and resets motor 553 when the carrier returns to its bottom position after a scan cycle has been completed.

Figure 8:
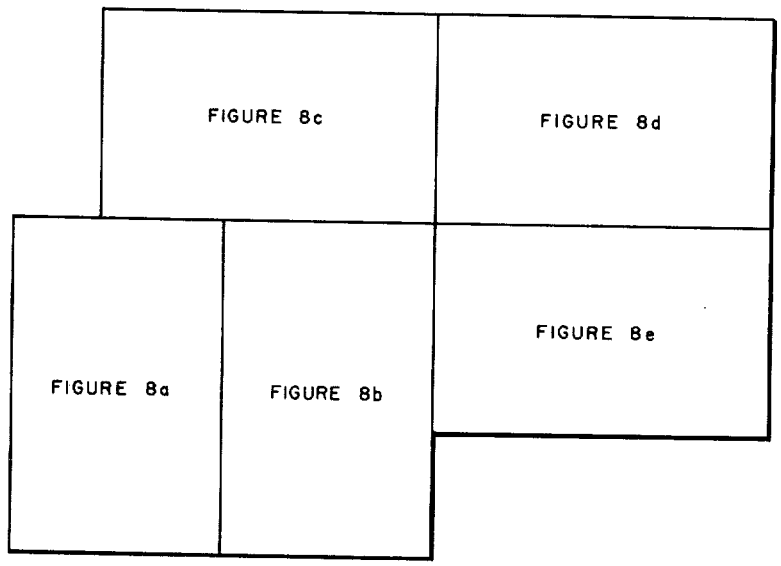
FIGURE 8 is a schematic diagram showing the proper arrangement of FIGURES 8a, 8b, 8c, 8d and 8e.

FIG. 8 shows schematically the proper arrangement of FIGS. 8a, 8b, 8c and 8d to form a unitary circuit.

While FIGS. 8a, 8b, 8c and 8d together represent an expansion of the block diagram of FIG. 2, there is, however some difference between them. In certain instances in FIG. 2, for the purpose of simplicity, single conductors were shown between different components where, in reality, a number exist and are shown in FIGS. 8a, 8b, 8c and 8d. The components described in FIG. 2 have been identified in FIGS. 8a, 8b, 8c and 8d and where a number of components are shown for a single component of FIG. 2 they have been grouped by the use of dashed lines and generally identified by the same reference numeral used in FIG. 2. In certain instances the lines of division were not clear cut but were arbitrarily chosen to facilitate the description of the circuit and its operation.

Figure 8A:
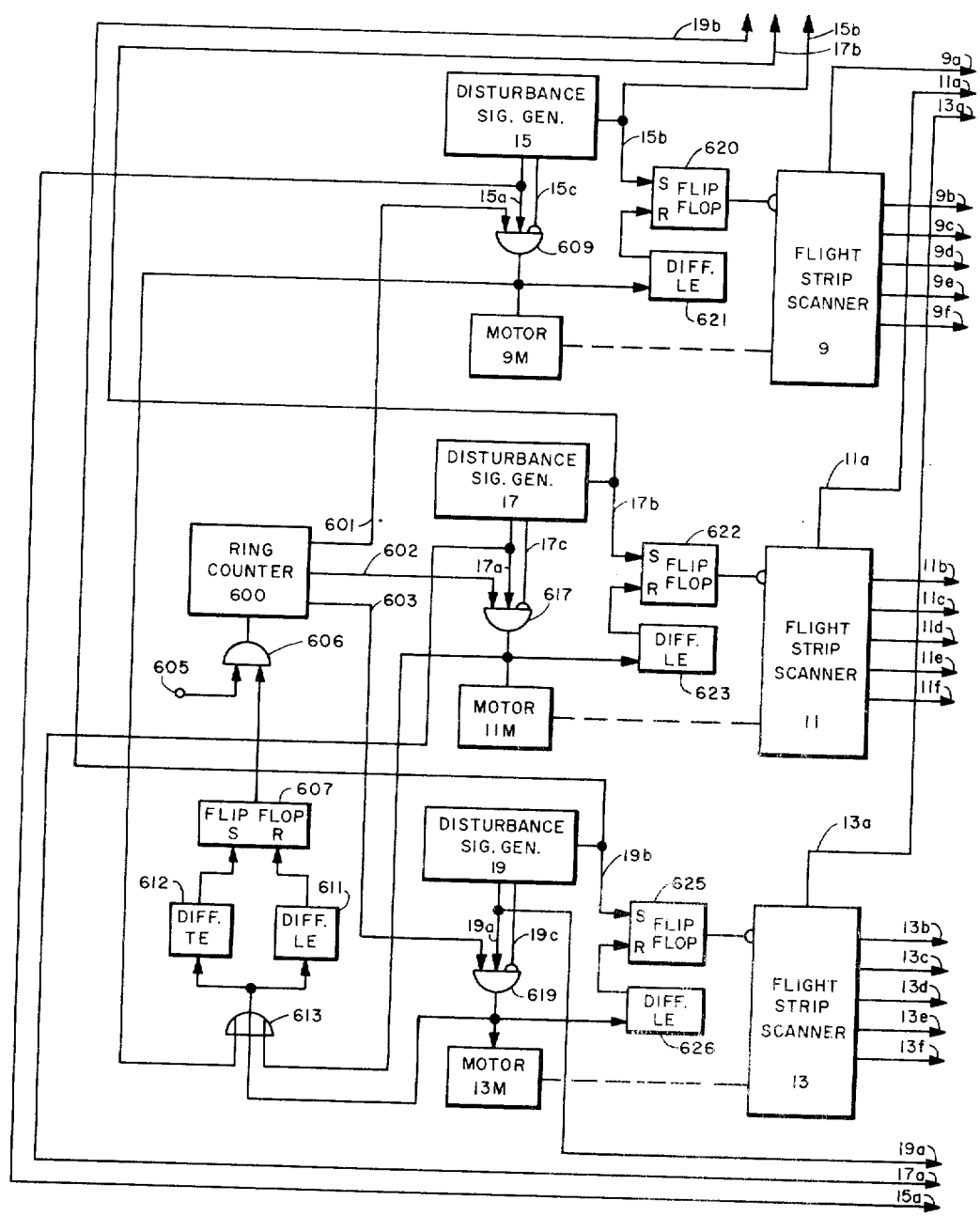

In FIG. 8a flight strip scanners 9, 11 and 13 are arranged to scan strips located in bays as set forth in the description of FIG. 2. Scanners 9, 11 and 13 are drivingly connected to motors 9M, 11M and 13M, respectively. Disturbance signal generators 15, 17 and 19 provide signals on conductors 15a, 17a and 19a, respectively, which actuate motors 9M, 11M and 13M, respectively, when one or more of the bays is disturbed by either the removal of or the addition of a strip or any other movement of a strip or strips within a bay which might have resulted in a change in the order of the strips within one or more of the bays. It should be noted that a disturbance in one bay only will result in a scan of that bay only since disturbance signal generator 15, motor 9M and flight strip scanner 9 operate independently of disturbance signal generator 17, motor 11M and flight strip scanner 11 or disturbance signal generator 19, motor 13M and flight strip scanner 13.

The output on conductor 15a from disturbance signal generator 15 is supplied to motor 29M of FIG. 8e and is used to inhibit the motor during a disturbance. In a similar manner the output from disturbance signal generator 17 is supplied to motor 31M by conductor 17a and the output of disturbance signal generator 19 is supplied to motor 33M by conductor 19a.

The outputs of scanners 9, 11 and 13 are processed for distribution to memory device 21 by a single system of circuits, which will be described in detail later, and thus, sequencing is required so that only one scanner at any given time operates and supplies information for recording in the memory device.

A ring counter 600 provides outputs on three conductors 601, 602 and 603 sequentially. The counter is stepped by clock pulses, from a clock which is not shown. The pulses are applied to a terminal 605 and to the counter via an "and" gate 606. "And" gate 606 is controlled by a flip-flop 607 in a manner which will be described later.

Conductor 601 is connected to one input of an "and" gate 609. Conductor 15a from disturbance generator 15 is connected to another input of the gate and the gate is opened whenever conductor 601 is energized. The output of the gate is applied to motor 9M which operates flight strip scanner 9. A conductor 15c from disturbance signal generator 15 will when energized inhibit gate 609 and prevent energization of motor 9M. The output on conductor 15c is provided during those times when the associated bay is disturbed and is derived from photocell 532 shown and described in FIG. 5. This prevents scanning while the strips in the bay are moved or about to be moved.

When the system is activated flip-flop 607 is automatically set by applying a pulse to the set input marked "S." This gates the clock pulses through gate 606 and provides for the sequential stepping of counter 600 at the clock rate. It is necessary, however, to stop the clock when a scanning operation is required and to start it again once it is completed. To this end the output of gate 609 is applied to two differentiating circuits 611 and 612 through an "or" gate 613. Circuit 611 differentiates the leading edge of the output of gate 609 and applies the pulse so derived to the reset input "R" of flip-flop 607. This deenergizes the flip-flop output and closes gate 606 so that clock pulses are no longer available to step counter 600 and the counter output remains stationary on conductor 601 to hold gate 609 open.

When the scanning operation is completed the output on conductor 15a falls to zero and the output of gate 609 follows. The trailing edge of the output of gate 609 is differentiated by circuit 612 and the pulse so derived is applied to the set input of flip-flop 607 to turn it on. When flip-flop 607 is on gate 606 is again open and clock pulses are again applied to counter 600 so that it is stepped at the clock rate.

Conductor 602 is connected to "and" gate 617 and conductor 603 is connected to an "and" gate 619. "And" gates 617 and 619 are connected in bays 5 and 7 respectively, and perform the same functions and operate in the same manner as does "and" gate 609 described above.

Flight strip scanner 9 goes from the bottom of its bay to the top and then returns. It is therefore necessary to inhibit the scanner output on its return to the bottom rest position. Therefore generator 15 supplies a pulse signal on a conductor 15b when the scan is complete and the scanner reaches the top of the bay. This pulse is derived from microswitch 565 shown nd described in FIG. 5. The pulse is applied to flip-flop 620 and sets the flip-flop to provide a voltage to inhibit the outputs of scanner 9. Flip-flop 620 is turned off and scanner 9 enabled the next time a scan is required by a pulse derived by differentiating the leading edge of the output of gate 609 in a differentiating circuit 621.

A conductor 17b from disturbance generator 17 and a flip-flop 622 combine to inhibit scanner 11 and a differentiating circuit 623 connected between the output of gate 617 and flip-flop 622 enable scanner 11 when a scan of bay 5 is required. A flip-flop 625 and a differentiating circuit 626 provide for inhibiting and enabling of scanner 13 in the same manner as described above.

Flight strip scanner 9 provides six outputs to the system. Conductor 9a provides an output for a bay signal which identifies the bay and indicates that the scanner is in operation. Conductors 9b, 9c, 9d and 9e each provide an output for one of the columns on the coded portion of the flight strip. Conductor 9f provides an output for the fifth column on the coded portion of the flight strip which takes the form of clock or sprocket pulses. The outputs on conductors 9b, 9c, 9d and 9e provide coded digital signals which are used to identify the aircraft and the fix point covered by a given strip. The five columns are scanned simultaneously and successive strips in a bay are scanned serially.

Flight strip scanners 11 and 13 also provide these same six outputs, but with respect to the strips contained in the bay with which each is associated. Conductors 11a, 11b, 11c, 11d, 11e and 11f provide the outputs for scanner 11 and conductors 13a, 3b, 13c, 13d, 13e and 13f the outputs for scanner 13.

Output conductors 9a, 11a, and 13a are connected to a duplexing switch 300 shown in FIG. 8b which is used to connect output conductors 9b through 9f, 11b through 11f, and 13b through 13f, respectively, to a single set of output conductors 300b through 300f.

Switch 300 provides a connection between conductors 9b and 300b, 9c and 300c, 9d and 300d, 9e and 300e, and 9f and 300f. Switch 300 also provides a connection between conductors 11b through 11f and 300b through 300f, and between 13b through 13f and 300b through 300f when conductors 11a and 13a, respectively, are energized.

Output conductor 300b is connected to a seven bit register 301 by an "or" gate 302; output conductor 300c is connected to another seven bit register 303 by an "or" gate 304; output conductor 300d is connected to another seven bit register 305 by an "or" gate 306; and output conductor 300e is directly connected to another seven bit register 307.

The output of register 307 is connected to register 305 by "or" gate 306; the output of register 305 is connected to register 303 by "or" gate 304; and the output of register 303 is connected to register 301 by "or" gate 302.

The clock or sprocket signal on output conductor 300f is connected to the input of a counting circuit 309 which provides a single output pulse each time seven input pulses are counted. The output of counter 309 is applied to one input of an adding circuit 311, sometimes referred to as a half adder. The other input of circuit 311 is connected to the output of a register 313 and the output of circuit 311 is connected to the input of register 313. Thus, register 313 always contains the sum of the outputs of counter 309.

A drum address generator 315 shown in FIG. 8c provides a signal which indicates digitally the peripheral position of the memory drum with respect to the combination recording and readout heads associated with the drum. A conductor 317 connects the drum address generator to one input of an "and" gate 318. The other input of gate 318 is connected to the output of counter 309 by a flip-flop 310 which is set by the counter output pulse and gate 318 will pass the drum address signal only when counter 309 provides an output to set flip-flop 310. That is only after each count of seven. The output of register 313 and "and" gate 318 are compared in a circuit 319 which supplies an output when a successful comparison is made. After a successful comparison has been made the output of circuit 319 is used to reset flip-flop 310 so that it is ready to handle the next operation.

The output from comparator 319 is supplied to one input of an "and" gate 321 and one input of an "and" gate 322. A clock pulse, from a master clock not shown, is supplied to the other input of gate 321 via a terminal 323. Therefore, when comparator 319 has an output the master clock pulses are supplied through "and" gate 321 to registers 301, 303, 305 and 307 which are read out serially. The register outputs are passed through "and" gate 322 to the input of a duplexing switch 324.

Switch 324 is connected to conductors 9a, 11a and 13a and is controlled thereby in a manner similar to the control of switch 300, previously described. Switch 324 has three output conductors 324a, 324b and 324c which are connected to the combination record and read heads associated with tracks T₁, T₂ and T₃, respectively, of memory device 21 shown in FIG. 8c.

Conductors 9a, 11a and 13a are each connected via an "or" gate 325 to a differentiating circuit 326 which provides a pulse output to register 313 to reset the register when the voltage level in any of the conductors decreases. Thus, when a scan is completed and, depending on which bay was scanned the voltage level of conductors 9a, 11a or 13a decreases, register 313 is reset to zero and the system is ready to undertake another scanning operation.

Computer 25, FIGURE 8c, supplies information bearing electric signals to the system. The signals supplied by computer 25 are the result of computations based on information inputs to the computer, which inputs may be the same as those described in connection with the description of FIG. 3. The signals from computer 25 are divided into two portions. The first portion contains the identification of the aircraft and the fix point covered. This portion of the signal is in the same format as the information recorded on tracks $T_1$, $T_2$ and $T_3$ of memory device 21. The second portion of the signals is the message or update portion. This portion contains new or updating information relative to a given aircraft and fix point.

The signals from computer 25 are applied to buffer track $T_7$ in memory device 21 through a record and read head associated with the track. The signals are assembled on track $T_7$ and then applied to a transfer circuit 327 which transfers a signal aircraft identification, fix point and update message to a recirculating register 329.

The identification and fix point information in tracks $T_1$, $T_2$ and $T_3$ is applied to a sequencing circuit 331, the operation of which will be described in detail later, which provides outputs on conductors 331a, 331b1, 331b2 and 331b3. The output on conductor 331a contains in serial form all of the information on tracks $T_1$, $T_2$ and $T_3$. This is applied to one input of a comparison circuit 333 where it is compared with the identification and fix point information in recirculating register 329. When a successful comparison is made the output from comparator 333 is applied to a duplexer switch 337 which is functionally identical to switch 324 of FIG. 8b.

Sequencer 331 provides an output on either conductor 331b1, 331b2 or 331b3 to indicate which of tracks $T_1$, $T_2$ or $T_3$ is supplying the information on conductor 331a. The outputs on conductor 331b1, 331b2 and 331b3 are used to operate duplexer switch 337 which will connect comparator 333 to one of the counter-comparators 338, 339 and 340 which are connected to one input of "and" gates 338', 339' and 340', resspectively. The drum address signal from generator 315 is applied to each counter-comparator. Counter-comparators 338, 339 and 340 count the number of updates applied to their respective tracks and compare the total number of messages received to the drum address signal in order to insure the recording of incoming messages in the next open position in its respective update track, via "and" gates 338', 339' and 340'. Recirculating register 329 is connected to tracks $T_4$, $T_5$ or $T_6$, respectively, by "and" gates 338', 339' and 340' depending on which of tracks $T_1$, $T_2$ or $T_3$ contains the same identification and fix point information as is contained in the update in register 329. After an update is recorded in a track the counter-comparator associated with that track increases its count by one to make sure that the next update for that track will be recorded in the next open position in the track. When a counter reaches a count which is equal to the maximum number of message positions on its associated track it recycles and provides for recording the next message in the initial position in its associated track.

The information contained on tracks $T_4$, $T_5$ and $T_6$ is supplied to logic circuit 35 shown in FIGS. 8d and 8e via conductors 341, 342 and 343, respectively. Here, as in the case of recording the results of scanning, a group of circuits are time shared for distributing the updates in tracks $T_4$, $T_5$ and $T_6$ to their respective bays. Therefore, a sequencing circuit 334, the operation of which will be described in detail later, is provided to connect the various update tracks to their respective bays.

Sequencer 334 performs two time separated functions for each bay and its associated memory track. Before update information recorded on the track can be printed on the appropriate strip in the associated bay the print head must be vertically positioned opposite the strip. Thus, sequencer 334 provides voltages on two different conductors for each of the bays; one of the voltages controls vertical positioning of the print head and the other controls the actual printing of the update message on the strip.

Conductors 341, 342 and 343 are connected to one input of "and" gates 344, 345 and 346, respectively. The other inputs of gates 344, 345 and 346 are connected to counter-comparators 347, 348 and 349, respectively. The counter-comparators are substantially identical with counter-comparators 338, 339 and 340 in construction and operation. The counter-comparators keep a running count of the number of updates read out and compare this count with the drum address signal on conductor 317 to insure that all the update messages in each track are read out sequentially.

Sequencer 334 provides output voltages on conductors 29a1, 31a1 and 33a1 in sequence whenever print heads 29, 31 and 33, respectively, are ready to accept positioning information and two or more conductors will never be energized simultaneously. These conductors are connected to "and" gates 374, 375 and 376 by "or" gates 367, 368 and 369, respectively. Thus, when conductor 29a1 is energized gate 374 is opened and the drum address signal is gated into counter-comparator 347 where it is compared to the count contained within the counter, which in the instance of an initial operation will be number one. When a successful comparison is made an output is developed which opens "and" gate 344 to permit passage of the update information through the gate.

Conductors 29a1, 31a1 and 33a1 are also connected to a duplexing switch 350 which has three information inputs and three information outputs which are combined in a single output so that the output is connected to different inputs when one of conductors 29a, 31a1 or 33a1 are energized.

"And" gates 344, 345 and 346 are each connected by a separate conductor to the inputs of duplexing switch 350. Thus, when sequencer 334 provides an output on conductor 29a1 the output of "and" gate 344 is passed through switch 350 to an "or" gate 352. When conductor 31a1 is energized the output of "and" gate 345 is passed through switch 350 to "or" gate 352; and when conductor 33a1 is energized the output of "and" gate 346 is passed through switch 350 to "or" gate 352. It has been previously pointed out that only one of conductors 29a1, 31a1 and 33a1 may be energized at any given time thus switch 350 is time shared between the update tracks by sequencer 334.

"Or" gate 352 is connected to the input of a recirculating register 351 and the identification and fix point portion of the update signal applied to register 351 via switch 350 and "or" gate 352 is compared with the index information in conductor 331a using comparison circuit 353 which provides an output to an "and" gate 355 when a successful comparison has been made. The drum address signal in conductor 317 is applied to the other input of gate 355 and is passed to the input of a duplexing switch 357 when the successful comparison is made in comparator 353. The track signals in conductors 331b1, 331b2 and 331b3 are applied to switch 357 which selects one of three output conductors 360, 361 and 362 depending on which track the index information which compared in comparator 353 was located.

The drum address signal gives the position of the strip in the bay selected by the signal in conductors 331b1, 331b2 or 331b3. This signal is applied to motors 29M, 31M and 33M depending in which track the index information is located on, as indicated by a signal on conductors 331b1, 331b2 or 331b3. Motors 29M, 31M and 33M are drivingly connected to print heads 29, 31 and 33, respectively, and will in response to the drum address signal position their respective print heads at the strip which contains the same aircraft identification and fix point information as is contained in the update message.

Sequencer 334 also provides output voltages on conductors 29b1, 31b1 and 33b1 in sequence when the print heads 29, 31 and 33 respectively are positioned and ready to accept update information for printing. These conductors are connected to "and" gates 374, 375 and 376 by "or" gates 367, 368 and 369, respectively, and coact with counter-comparators 347, 348 and 349 in the same manner as does a voltage on conductors 29a1, 31a1 and 33a1.

"And" gates 344, 345 and 346 are also connected by separate conductors to a duplexing switch 354 which may be similar in function and construction to duplexing switch 350. Switch 354 is connected to sequencer 334 by conductors 29b1, 31b1 and 33b. Thus, when sequencer 334 provides an output on conductor 29b1 the output of "and" gate 344 is passed through switch 354 to an "or" gate 358. When conductor 31b1 is energized the output of "and" gate 345 is passed through switch 354 to "or" gate 358; and when conductor 33b1 is energized the output of "and" gate 346 is passed through switch 354 to "or" gate 358. As was pointed out above in the case of conductors 29a1, 31a1 and 33a1 only one of conductors 29b, 31b1 and 33b1 may be energized at any given time and switch 354 is also time shared between the update tracks by sequencer 334.

"Or" gate 358 is connected to a recirculating register 371 by a conductor 358a and the update signal applied to register 371 via switch 354 and "or" gate 358 is applied to distributor 377 which divides the serial update signal into various components. The first component contains the type of update or horizontal positioning information and is applied to a horizontal position signal register 378. The second component contains information relative to vertical position of the update on the strip and is applied to a vertical line position signal register 380. The third component is the first character of the actual message and is applied to a character selection signal register 379. The fourth component of the update message, that is the remaining characters, is retained in recirculating register 371 and applied through distributor 377 one character at a time as each preceding character is printed in response to pulses from the associated print head which indicate that a character has been printed. The source of these pulses and how they are processed will be described later. A counter 381 is connected between the output of character register 379 and horizontal position register 378 to advance the signal from register 378 by one position each time a complete character signal has been registered.

The outputs of registers 378, 379 and 380 are connected to duplexing switches 381, 383 and 385, respectively. Switches 381, 383 and 385 each have three outputs and are controlled by the outputs of sequencer 334 appearing on conductors 29b1, 31b1 and 33b1 in the same manner as is switch 350. Switches 381 and 383 each have their outputs connected to print heads 29, 31 and 33 and switch 385 has its outputs connected to motors 29M, 31M and 33M. Thus, depending on which track the update signal is stored, switches 381, 383 and 385 will distribute the update information from registers 378, 379 and 380 to the proper bay.

Sequencer 334 provides three additional outputs 29a, 31a and 33a which indicate when print heads 29, 31 and 33, respectively, have completed printing an update. Conductor 29a is connected to counter-comparator 347 and increases the count therein by one each time print head 29 completes the printing of an update to insure that the next update on the memory track associated with print head 29 will be processed the next time that track is connected to the motor 29M or the print head 29. Similarly, conductors 31a and 33a are connected to counter-comparators 348 and 349, respectively.

Figure 9:
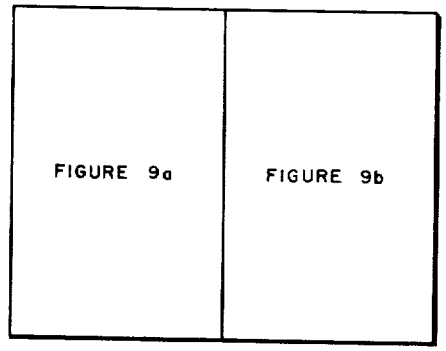
FIGURE 9 is a schematic diagram showing the proper arrangement of FIGURES 9a and 9b.

The outputs from sequencer 334 described above are derived from various inputs to the sequencer which will now be described and internal circuitry which is shown in detail along with the inputs and outputs in FIG. 9 and will be described later. At this time only the origin of the inputs and the general consequences of their application to the sequencer will be set forth. An explanation of how the inputs achieve the results stated here will be deferred until the following explanation of the operation of the circuit shown in FIG. 9.

Conductors 15b, 17b and 19b from disturbance signal generators 15, 17 and 19, respectively, are connected to sequencer 334 and the end of scan pulse from disturbance signal generators 15, 17 and 19 is used to enable conductors 29a1, 31a1 and 33a1, respectively. This signal is used since it is indicative that information in the nature of an update might be available.

Print heads 29, 31 and 33 provide voltage level outputs on conductors 29d, 31d and 33d, respectively, whenever they are in their bottom or rest position since when they are in this position they are ready to receive positioning information. The outputs on conductors 29d, 31d and 33d will enable conductors 29a1, 31a1 and 33a1, respectively.

The output of comparator 353 indicates that a successful comparison has been made and it is used to gate the drum address signal in cooperation with the track signals in conductors 331b1, 331b2 and 331b3 to the proper bay. This same output is also applied to one input of "and" gates 353a1, 353a2 and 353a3 by a conductor 353a. The other input of gates 353a1, 353a2 and 353a3 are connected to conductors 331b1, 331b2 and 331b3, respectively. The output of gate 353a1 is applied to sequencer 334 by a conductor 353b1 and is used to extinguish the output on conductor 29a1 since the positioning information requested by the output on conductor 29a1 has been applied to motor 29M. The output of gate 353a2 is applied to sequencer 334 by a conductor 353b2 and is used to extinguish the output on conductor 31a1 since the positioning information requested by the output on conductor 31a1 has been applied to motor 31M. Similarly, the output of gate 353a3 is applied to sequencer 334 by a conductor 353b3 and extinguishes the output on conductor 33a1 since the positioning information requested has been applied to motor 33M. The output from comparator 353 is applied to extinguish the correct "a1" output by using the output on conductors 331b1, 331b2 and 331b3 to operate gates 353a1, 353a2 and 353a3, respectively.

Motors 29M, 31M and 33M provide pulse outputs on conductors 29b, 31b and 33b, respectively, whenever they have, in response to positioning information supplied via conductors 360, 361 and 362, respectively, positioned their respective print heads. Conductor 29b enables conductor 29b1; conductor 31b enables conductor 31b1; and, conductor 33b enables conductor 33b1. It should be noted at this point that conductors 29b, 31b and 33b can only be energized after conductors 29a1, 31a1 and 33a1, respectively, have been energized and deenergized as previously described. The output on conductor 29b is provided by comparing the input to motor 29M with its position and gating a pulse when the motor position equals the input thereto. Motors 31M and 33M provide outputs 31b and 33b, respectively, in the same manner.

Switch 354 connects one of the tracks, depending on which of conductors 29b1, 31b1 and 33b1 is energized, to register 371 as was previously explained. At the same time the update in conductor 358a is applied to a preset counter 630 via a delay circuit 631. The update sets the preset counter at a count determined by the number of characters in the update; and each time a print head prints a character a pulse is supplied via conductors 29c, 31c or 33c, depending on which print head is actuated, and an "or" gate 632 to subtract one from the total count of preset counter 630. The preset counter output is applied to sequencer 334 via a differentiating circuit 633 and an output conductor 633a and supplies a pulse when the counter output falls to zero. This pulse is indicative of the successful completion or entry of an update message and it is used to accomplish simultaneously three things. One, it extinguishes 29b1, 31b1 or 33b1, depending on which of the three conductors was energized; two, it enables conductors 29a1, 31a1 or 33a1, depending on which of the "b1" conductors was energized; and three, it provides, in conjunction with internal circuitry which will be fully described later, pulses for advancing the count of counters 347, 348 or 349, as the case may be.

In addition to the above the output of "or" gate 632 is applied to one input of gate 634 and then to distributor 377 to extract succeeding characters from register 371. The inhibit input of gate 634 is connected to preset counter 630 which provides an output when the count of "one" is reached so that no further pulses will be applied to distributor 377. This is required since register 371 no longer contains new information when the print heads supply a pulse after the last character in the message has been printed.

From time to time situations will arise when no update message will be present in a given track. Under these circumstances it is advantageous to disable the particular "a1" conductor to eliminate that information track from the sequencing to conserve time. Whenever such a situation arises the counts of the counters 338 and 347, 339 and 348, or 340 and 349 will be identical. Therefore the output of counter 338 on conductor 338a and the output of counter 347 on conductor 347a are applied to sequencer 334 where they are compared, and if identical, used to develop an output for disabling conductor 29a1. The outputs of counters 339 and 348 on conductors 339a and 348a, respectively, and the outputs of counters 340 and 349 on conductors 340a and 349a, respectively, are applied to sequencer 334 in a similar manner to disable conductors 31a1 and 33a1 as the case may be.

In the detailed view of sequencer 334 shown in FIGS. 9a and 9b six flip-flops 701–706 and a six stage ring counter 709 constitute the heart of the device. Each flip-flop has two inputs "S" and "R," for set and reset, respectively. When the set input is energized by a pulse or a voltage level the flip-flop develops an output and when the reset input is similarly energized the output is extinguished.

The outputs of flip-flops 701–706 are connected to one of the inputs of "and" gates 711–716, respectively. The first and second stage outputs of ring counter 709 are connected to the other inputs of gates 711 and 712, respectively. The third and fourth stage outputs of the counter are connected to the other inputs of gates 713 and 714, respectively, and the fifth and sixth stage outputs of the counter to the other inputs of gates 715 and 716, respectively. The output of gate 711 is provided on conductor 29a1; of gate 712 on conductor 29b1; of gate 713 on conductor 31a1; of gate 714 on conductor 31b1; of gate 715 on conductor 33a1; and of gate 716 on conductor 33b1.

Ring counter 709 is stepped by clock pulses, from a clock not shown, applied to a terminal 718 and applied to the counter through an "and" gate 719. The gate is initially opened when the system is activated by applying a set pulse to a flip-flop 720. The outputs of gates 711–716 are connected to an "or" circuit 722. The output of "or" circuit 722 is applied through a differentiating circuit 724, which supplies a pulse for resetting flip-flop 720 when one of the gates 711–716 develops an output. When flip-flop 720 is reset gate 719 is closed and counter 709 is stopped at its present position to maintain the status quo until such time as an update operation described previously is completed.

The outputs of gates 711–716 are also connected to an "or" circuit 723 and the output of the "or" circuit is applied through a differentiating circuit 726, which supplies a pulse for setting flip-flop 720 when one of gates 711–716 goes from an output condition to a no output condition. When flip-flop 720 is set, gate 719 is again open and counter 709 will be stepped until such time as another of flip-flops 701–706 provide, in conjunction with the outputs of ring counter 709, an output on an "a1" or "b1" conductor to stop the counter as described above.

Conductors 15b and 29d are connected to the set input of flip-flop 701 by an "or" gate 728 and enable conductor 29a1 when either is properly energized as previously described. By enabling the conductor it is meant that the conductor will be energized when and if the ring counter sequences the associated flip-flop. Conductors 17b and 31d are connected to the set input of flip-flop 713 by an "or" gate 729 and enable conductor 31a1; and conductors 19b and 33d are connected to the set input of flip-flop 715 by an "or" gate 730 to enable conductor 33a1 in a similar manner.

Conductor 353b1 is connected to the reset input of flip-flop 701 via an "or" gate 731 and will extinguish the output on conductor 29a1 when the requested positioning information has been inserted in motor 29M by the opening of switch 357 by conductor 331b1.

Conductor 29b is connected to the set input of flip-flop 702. When conductor 29b is energized, that is, after positioning has been completed and printing is requested, flip-flop 702 is set to enable conductor 29b1. When the printing operation in bay 3 is completed a pulse is applied on conductor 633a, as previously described, to a pair of "and" gates 733 and 735. Gate 733 is open since conductor 29b1 is energized; and the pulse from conductor 633a is applied to the reset input of flip-flop 702 via conductor 29b2.

While conductor 29b1 is energized it sets a flip-flop 737 which provides an output via conductor 29b3 to open gate 735 and the pulse applied via conductor 633a is applied through conductor 29a to counter 347 to increase its count as previously described and to flip-flop 701 via "or" gate 728 to set it, thus enabling conductor 29a1 which indicates that print head 29 is again ready to receive positioning information.

Conductor 353b2 is connected to the reset input of flip-flop 703 via an "or" gate 739 and will extinguish the output on conductor 31a1 when the requested positioning information has been inserted in motor 31M by the opening of switch 357 by conductor 331b2.

Conductor 31b is connected to the set input of flip-flop 704. Thus, when conductor 31b is energized after positioning has been completed in response to the energization of conductor 31a1, flip-flop 704 is set to enable conductor 31b1. When the printing operation in bay 5 is completed a pulse is applied on conductor 633a to a pair of "and" gates 740 and 741. Gate 740 is open since conductor 31b1 is energized and the pulse from conductor 633a is applied to the reset input of flip-flop 704 via conductor 31b2.

While conductor 31b1 is energized it sets a flip-flop 743 which provides an output via conductor 31b3 to open gate 741 and the pulse applied via conductor 633a is applied through conductor 31a to counter 348 to increase its count as previously described and to flip-flop 703 via "or" gate 729 to set it thus enabling conductor 31a1 which indicates that print head 31 is again ready to receive positioning information.

Conductor 353b3 is connected to the reset input of flip-flop 705 via an "or" gate 747 and will extinguish the output on conductor 33a1 when the requested positioning information has been inserted in motor 33M by the opening of switch 357 by conductor 331b3.

Conductor 33b is connected to the set input of flip-flop 706. Thus, when conductor 33b is energized after positioning has been completed in response to the energization of conductor 33a1, flip-flop 706 is set to enable conductor 33b1. When the printing operation in bay 7 is completed a pulse is applied on conductor 633a to a pair of "and" gates 748 and 749. Gate 748 is open since conductor 33b1 is energized and the pulse from conductor 633a is applied to the reset input of flip-flop 706 via conductor 33b2.

While conductor 33b1 is energized it sets a flip-flop 750 which provides an output via conductor 33b3 to open gate 749 and the pulse applied via conductor 633a is applied through conductor 33a to counter 349 to increase its count as previously described and to flip-flop 705 via "or" gate 730 to set it and thus enable conductor 33a1 to indicate that print head 33 is again ready to receive positioning information. Conductors 29a1, 31a1 and 33a1 are connected to the reset inputs of flip-flops 737, 743 and 750, respectively, to restore them to an inactive condition so that the cycle described above may be repeated for succeeding update operations.

In order to assure smooth and efficient operation of the system sequencer 334 contains means for detecting when a given track has no update message to be printed. This is accomplished by comparing the counts of counter-comparators 338 and 347 and providing a pulse for resetting flip-flop 701 whenever they are equal so that the output on conductor 29a1 will be extinguished and ring counter 709 restored to its sequencing mode of operation. In a like manner the counts of counters 339 and 348 and of counters 340 and 349 are compared. When counters 339 and 348 are equal flip-flop 703 is reset; and when counters 340 and 349 are equal flip-flop 705 is reset. In both instances ring counter 709 will be restored to its sequencing mode of operation after the pulse is applied and the flip-flops are reset.

Conductors 338a and 347a are connected to one input of "and" gates 752 and 754, respectively. The other input of each gate is connected to conductor 29a1 so that the gates are opened whenever conductor 29a1 is energized. The output of gate 752 is applied to one input of comparator circuit 756 by an "or" gate 757; and the output of gate 754 is applied to another input of comparator 756 by an "or" gate 758.

The output of comparator 756 is connected to one input of "and" gates 760, 761 and 762. The other inputs of gates 760, 761 and 762 are connected to conductors 29a1, 31a1 and 33a1, respectively. The output of "and" gate 760 is connected to "or" gate 731.

Conductors 339a and 348a are connected to one input of "and" gates 764 and 765, respectively. The other input of each gate is connected to conductor 31a1 so that the gates are opened whenever conductor 31a1 is energized. The output of gate 764 is applied to the said one input of comparator 756 by "or" gate 757; and the output of gate 765 is applied to the said other input of comparator 756 by "or" gate 758. Both inputs are processed as previously described for conductors 338a and 347a.

Conductors 340a and 349a are connected to one input of "and" gates 767 and 768, respectively. The other input of each gate is connected to conductor 33a1 so that the gates are opened whenever conductor 33a1 is energized. The output of gate 767 is applied to the said one input of comparator 756 by "or" gate 757; and the output of gate 768 is applied to the said other input of comparator 756 by "or" gate 758. Here again both inputs are processed as previously described for conductors 338a and 347a. It should be noted, however, that the output of comparator 756 is distributed into three different channels to flip-flops 701, 703 or 705 depending on which of conductors 29a1, 31a1 or 33a1 is energized.

In the detailed view of sequencer 331 shown in FIG. 10 a three stage ring counter 780 is stepped once each drum revolution. This is accomplished by applying the drum address generator output on conductor 317 to a counter 781 which provides a pulse output each time the drum revolves once. The first stage output on conductor 331b1 is used to open an "and" gate 782 and connect the output from track T₁ to conductor 331a via an "or" gate 784. The second stage output on conductor 331b2 is used to open an "and" gate 785 and connect the output from track T₂ to conductor 331a via "or" gate 784; and the third stage output on conductor 331b3 is used to open an "and" gate 786, and connect the output from track T₃ to conductor 331a via "or" gate 784. With this arrangement three drum revolutions are required to sequentially read tracks T₁, T₂ and T₃. While track T₁ is being read the output on conductor 331b1 is indicative of that fact and likewise the outputs on conductors 331b2 and 331b3 indicate that tracks T₂ and T₃, respectively, are being read.

When it is desired to place a console, which has been inactive, into operation the operator will assemble the flight strips in the bays. When this has been completed the scanning operation is started. Each bay is sequentially scanned and the punch coded information relative to fix point and aircraft identification contained on each flight strip is inserted in a predetermined location in the index portion of the memory device which corresponds to the location of the strip in the console.

When this operation is completed the console is ready to receive updating messages relative to the strips contained within the console. The messages which include the fix point and aircraft identification as well as the updating information are stored in the buffer portion of the memory and are sequentially compared to the index to determine the bay in which the strip containing the same fix point and aircraft identification is located. Depending in which bay the strip is located the message is switched into a location in the updating portion of the memory device which contains only the information directed to strips contained within that bay. The update portion of the memory device contains a different location for the storage of information directed to strips contained within different bays.

The information relative to strips contained within the bays is assembled in the update portion of the memory device in locations corresponding to the bays and again compared with the index portion to determine the location of the strip to be updated with the bay. This is accomplished by comparing fix point and aircraft identification information to the information contained in the index portion of the memory device and reading the memory address signal when a comparison is made. The memory address signal corresponds to the physical location of the strip within the bay since the first strip fix point and aircraft identification information appears in the first position in the index portion of the memory device and each succeeding strip fix point and aircraft identification information appears in a succeeding position in the index portion of the memory device.

The memory address signal is gated to the print head motor and used to position the print head at the proper strip. When the print head is positioned the update message is inserted and the printing operation completed.

This procedure continues until such time as the strips in one or more bays are distributed. Once a disturbance occurs the scanning device is again activated and a new index is recorded to correct for any changes which might have taken place during the disturbance.

The foregoing describes the application of the invention to the solution of an air traffic control problem, but the invention may be utilized in many different fields where the processing and display of data is needed. The system chosen for description was simplified in order to facilitate the explanation of its operation and it need not be limited to either the type or amount of information handled in the specific embodiment described. Furthermore, applicants wish it expressly understood that the invention is not limited to the specific embodiment used for the purpose of illustration.

What is claimed is:

1. A data processing and display system comprising an array of strip of material suitable for displaying printed characters each mounted on an individual platen holder, said strips being arranged in a substantially static display which is subject to revision by the displacement of one or more of the individual strips comprising the array, a memory device having an index portion and an update portion, means for scanning the strips and for recording portions of the information contained on each strip in a location in the said index portion of the memory which is the analogue of the physical location of that strip being scanned, a source of information bearing signals, said signals including updating information for one or more of the strips and in addition thereto an identifying portion which is a repetition of that portion of the information contained on each of the strips to be updated which is recorded in the index portion of the memory device, means for scanning said memory device and comparing said identifying portion of the information bearing signals to the index portion of the memory device and for recording the information bearing signals in locations in the update portion of the memory device which are an analogue of the physical location of the corresponding information in the index portion, and means responsive to the recorded update information for producing changes which correspond to the update information in that strip of the array which corresponds to the identifying portion of the information bearing signals.

2. A data processing and display system comprising an array of mediums suitable for displaying recorded information in permanent form and arranged in a substantially static display which is subject to revision by the displacement of one or more of the individual mediums comprising the array, a memory device having an index portion and an update portion, means for scanning the medium and for recording portions of the information contained on each medium in a location in the said index portion of the memory which is the analogue of the physical location of that medium being scanned, a source of information bearing signals, said signals including updating information for one or more of the mediums and in addition thereto an identifying portion which is a repetition of that portion of the information contained on each of the mediums to be updated which is recorded in the index portion of the memory device, means for scanning said memory device and comparing said identifying portion of the information bearing signals to the index portion of the memory device for recording the information bearing signals in locations in the update portion of the memory device which are an analogue of the physical location of the corresponding information in the index portion, means responsive to the recorded update information for producing changes which correspond to the update information in that medium of the array which corresponds to the identifying portion of the information bearing signals, and means for detecting a disturbance of the array of mediums and for instituting a scan of the mediums so that the index portion of the memory device will be revised to always correspond with the array.

3. A data processing and display system comprising an array of paper strips for recording information, said strips being arranged in a substantially static display which is subject to revision by the displacement of one or more of the strips comprising the display, a memory device having an index portion and an update portion, a source of light and a plurality of light sensitive devices forming a unitary structure and arranged on opposite sides of the strips, means for supplying motive force to the unitary structure so that it scans the strips to detect predetermined variations, means for recording the signals from each of said strip in a location in the index portion of the memory device which is the analogue of the physical location of that strip in the display, a source of information bearing signals, said signals including updating information for one or more of the strips and in addition thereto an identifying portion which is identical to the signals supplied by the variations in the strips to be updated and which is recorded in the index portion of the memory device, means for scanning the memory device and for comparing the identifying portion of the information bearing signals to the index portion of the memory device and for recording the information bearing signals in locations in the update portion of the memory device which are an analogue of the physical location of the corresponding information in the index portion, and means including a print head having a predetermined number of characters responsive to the update information for printing the update information on the strip whose variations correspond to the identifying portion of the information recorded therein.

4. A data processing and display system comprising an array of paper strips for recording printed information in permanent form, said strips being arranged in a normally static array which is subject to revision by the displacement of one or more of the strips comprising the array, a memory device having an index portion and an update portion, a source of light and a plurality of photosensitive devices forming a U-shaped unitary structure which is arranged so that the light source and the photosensitive devices are on opposite sides of the strips, means connected to said unitary structure for causing said structure to traverse the strips and scan them to detect predetermined variations in the strips and to supply signals which correspond to the said variations, means for recording the signals from each of said strips in a location in index portion of the memory device which is the analogue of the physical location of the strip in the array which supplied the signals, a source of information bearing signals, said signals including updating information for at least one of the strips and in addition thereto an identifying portion which corresponds to the variation on that strip on which the update portion is to be eventually entered, means for scanning the memory device and for comparing the identifying portion and the index portion and for recording the information bearing signals in locations in the update portion of the memory device which are the analogue of the physical locations of the corresponding information in the index portion, means including a print head having a predetermined number of characters responsive to the update information for printing the update information on that strip whose variations correspond to the identifying portion of the recorded update, and means for detecting a disturbance of the strips and instituting a scan of the strips for revising the index portion of the memory device so that it will correspond to the revised strip order.

5. A data processing and display system comprising a substantially static array of uniquely coded mediums suitable for displaying information recorded thereon in permanent form, a memory device having an index portion and an update portion, means for scanning the uniquely coded portion of the mediums and for recording the coded information on each medium in a location in the index portion of the memory device which is an analogue of the physical location of the medium bearing that coded information in the array, a source of information bearing signal, said signals including updating information for at least one of said mediums and in addition thereto signals corresponding to the unique code of the medium being updated, first circuit means including a first comparator for comparing the portion of the information bearing signals corresponding to the unique code of the medium being updated and the index portion of the memory device to determine the location of the medium and for recording the information bearing signals in the update portion of the memory device in a location determined by the results of the comparison, second circuit means including a second comparator for comparing similar parts of the index and update portion of the memory device and providing an output indicative of the physical location of the medium which is to be updated, means responsive to said second circuit means for recording the updating information on that medium bearing the unique code which corresponds to the code in the information bearing signals, and means for detecting a disturbance of the mediums to revise the index portion of the memory device whenever said mediums become disturbed.

6. A data processing and display system as set forth in claim 5 wherein said uniquely coded mediums for recording information in permanent form each comprise a strip of material suitable for displaying printed characters, mounted on an individual platen holder.

7. A data processing and display system as set forth in claim 5 wherein the means responsive to the second circuit means for recording the update information includes a print head having a predetermined number of characters.

8. A data processing and display system as set forth in claim 5 wherein the means for scanning the uniquely coded mediums comprises a light source and a plurality of photosenstive devices arranged on opposite sides of the mediums and adapted to be moved simultaneously so as to detect the unique codes on the individual mediums and supply signals corresponding to said codes.

9. A data processing and display system as set forth in claim 1 wherein the means responsive to the update information for producing changes in the media includes a print head having a predetermined number of characters.

10. A data processing and display system as defined in claim 1 wherein said means for scanning the strips comprises a light source and a plurality of photosensitive devices arranged on opposite sides of the strips and adapted to be moved simultaneously so as to detect predetermined variations in the strips and supply a signal which corresponds to said variations.

11. A data processing and display system as set forth in claim 2 wherein the means responsive to the update information for producing changes in the media includes a print head having a predetermined number of characters.

12. A data processing and display system as set forth in claim 2 wherein said means for scanning the media comprises a light source and a plurality of photosensitive devices arranged on opposite sides of the media and adapted to be moved simultaneously so as to detect predetermined variations in the media and supply a signal which corresponds to said variations.

13. A data processing and display system as set forth in claim 2 wherein said mediums for recording information in permanent form each comprises a strip of material, suitable for displaying printed characters, mounted on individual platen holders.

References Cited in the file of this patent

UNITED STATES PATENTS

| | | |
|---|---|---|
| 2,549,071 | Dusek | Apr. 17, 1951 |
| 2,568,756 | McWhirter | Sept. 25, 1951 |
| 2,885,659 | Spielberg | May 5, 1959 |